(No Model.)
W. H. VAN RIPER.
FRUIT AND VEGETABLE GRATER.
No. 301,939. Patented July 15, 1884.
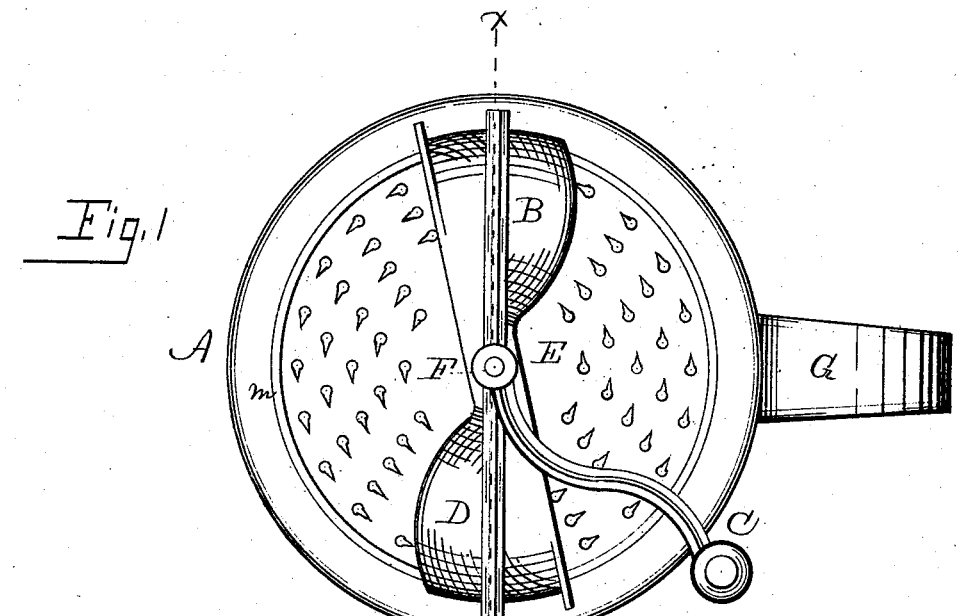
Fig. I
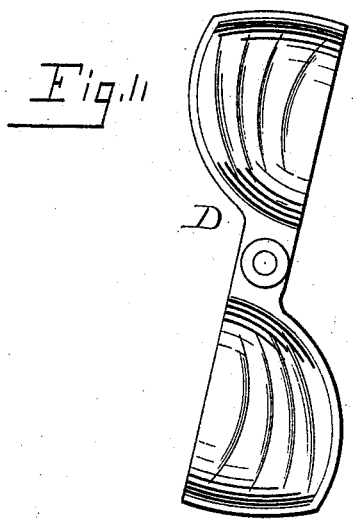
Fig. II
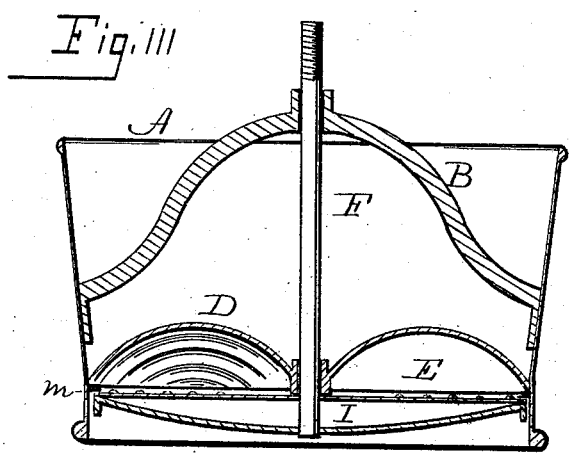
Fig. III
WITNESSES:
John Trautmann
Leopold Leebold
INVENTOR
William H. Van Riper
BY B. Pickering
ATTORNEY

UNITED STATES PATENT OFFICE.

WILLIAM H. VAN RIPER, OF DAYTON, OHIO.

FRUIT AND VEGETABLE GRATER.

SPECIFICATION forming part of Letters Patent No. 301,939, dated July 15, 1884.

Application filed March 20, 1884. (No model.)

*To all whom it may concern:*

Be it known that I, WILLIAM H. VAN RIPER, a citizen of the United States, residing at Dayton, in the county of Montgomery and State of Ohio, have invented a certain new and useful Improvement in Fruit and Vegetable Graters; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in a grater for fruits and vegetables; and it consists of a rotary grater with cutting-edges formed by punching a hole in a metallic plate and cutting a slot radially therefrom, the manner of supporting the same in the vessel, and the feeding device.

The mechanism is illustrated in the accompanying drawings, in which Figure I is a top view of the rotary grater. Fig. II is an under view of the feed-plate. Fig. III is a section of the grater on the line $x$ $x$.

Similar letters refer to similar parts throughout the several views.

A represents a vessel, made of tin, and is without a bottom, but has a narrow rim, $m$, which projects interiorly a little above the lower edge. Immediately above this rim is soldered to the sides of the vessel the feed-plate D. This plate has vertical wings for attachment to the vessel, a central orifice for the lower bearing of the shaft F, and is shaped between the center and extremes something like a bisected cone, with ribs or faces on the under concave surfaces.

The grater E is made of a circular metallic plate punched with holes, as is usual in making graters, and these holes are slotted radially, which presents a lengthened cutting-surface much superior to the ordinary cutting-edge of the raised round hole.

The arm B is soldered to the sides of the vessel over the feed, and has a bearing central to the same for the shaft. This serves only the purpose of a bearing, and may be modified by being attached to the feed-plate, and may form a part thereof. The grater-plate is soldered to the lower end of the shaft, and beneath which are stays I, which may consist of three or more arms, likewise soldered. The grater is put into its bearings from beneath, and onto the upper end is screwed the crank C, by which the grater is turned. It is held by the head of the crank slightly beneath the rim of the vessel. The material to be grated is placed within the vessel, the crank is turned to the right, the same gathers beneath the feed-plate, where it is held against the faces while the under surface is being cut away. The handle G is used as a matter of convenience in small-sized graters.

Having fully described my invention, what I desire to secure by Letters Patent is—

In a rotary grater, a feed-plate of two symmetrical parts having under serrated surfaces inclining downwardly and backwardly in position opposite of the cutting-edges of the grater, and is attached to the sides of the inclosing-vessel, the said grater being supported in an arm attached interiorly to the vessel at the top, and in an orifice of said feed-plate at the bottom, said parts combined substantially as set forth.

In testimony that I claim the foregoing as my own I affix my signature in presence of two witnesses.

WILLIAM H. VAN RIPER.

Witnesses:
   B. PICKERING,
   C. A. WALTMIRE.